United States Patent [19]
Johnson et al.

[11] Patent Number: 5,416,474
[45] Date of Patent: May 16, 1995

[54] COMMUNICATION NETWORK INCLUDING TIE BUS WITH INHERENT OR DEVICE BETWEEN TWO TIE BUS CONDUCTORS

[75] Inventors: Brion Johnson, Bountiful; Michael B. Lackey, Layton; Leon J. Stanger, Farmington; Ronald C. Ward, Salt Lake City, all of Utah

[73] Assignee: Utah Scientific, Inc., Salt Lake City, Utah

[21] Appl. No.: 49,761

[22] Filed: Apr. 20, 1993

[51] Int. Cl.$^6$ ............................................. H04Q 1/00
[52] U.S. Cl. .......................... 340/825.870; 340/825.79
[58] Field of Search ................... 340/825.87, 825.79, 340/825.8, 825.02, 826, 827, 825.24, 825.25; 307/465; 370/60, 62, 94.1, 56, 60.1; 348/705; H04N 5/268

[56] References Cited

U.S. PATENT DOCUMENTS

| | | | |
|---|---|---|---|
| 4,347,498 | 8/1982 | Lee et al. | 340/825.02 |
| 4,566,007 | 1/1986 | Richards | 340/825.8 |
| 4,701,756 | 10/1987 | Burr | 340/825.02 |
| 4,887,079 | 12/1989 | Hwang et al. | 340/825.8 |
| 4,991,171 | 2/1991 | Teraslinna et al. | 370/94.1 |
| 5,103,444 | 4/1992 | Leung et al. | 370/60 |
| 5,138,614 | 8/1992 | Baumgartner et al. | 370/62 |

Primary Examiner—Donald J. Yusko
Assistant Examiner—Edwin C. Holloway, III
Attorney, Agent, or Firm—Smith-Hill and Bedell

[57] ABSTRACT

A communication network for providing communication between multiple sources and multiple destinations includes a source selector (34; 70, 72; 90, 98) having a plurality of input terminals (22) for connection to respective sources (30), at least one output terminal (20; 100), and crosspoint elements (38; 80, 82; 92, 98) for connecting any selected set of the input terminals to the output terminal. A destination selector (18; 100) has at least one input terminal (20) connected to the output terminal of the source selector, a plurality of output terminals (24) for connection to respective destinations (30), and crosspoint elements (28; 102) for connecting the input terminal of the destination selector to any selected set of the output terminals of the destination selector.

11 Claims, 4 Drawing Sheets

COMMUNICATION NETWORK INCLUDING TIE BUS WITH INHERENT OR DEVICE BETWEEN TWO TIE BUS CONDUCTORS

BACKGROUND OF THE INVENTION

This invention relates to a communication network.

It is common for a host computer to serve multiple terminals, each of which might have local computing capabilities. A network connects the host computer to the terminals, and supports full duplex digital communication between each terminal and the host computer, and possibly among multiple terminals. Different kinds of networks are able to support different connection patterns among the nodes (host computer and terminals) connected to the network.

A typical television broadcast facility includes a studio equipped with at least one camera and a machine room containing multiple videotape recorders (VTRs). The producer in charge of a particular broadcast employs a control panel to select video signals from various sources, such as a camera in the studio and VTRs in the machine room, to compose the video signal that is to be broadcast. It is therefore necessary to deliver command messages from the control panel to the video sources to control the status of each video source, and response messages from the video sources to the control panel to indicate to the producer the status of each video source.

A bus standard was developed jointly by the Society of Motion Picture and Television Engineers and the European Broadcasting Union to facilitate control of multiple video devices such as cameras and VTRs, using a common bus over which messages can be passed to the devices. FIG. 1 illustrates in simplified form a network in accordance with the ESbus standard. As shown in FIG. 1, the network consists of a controller 2, which is typically embedded in the producer's control panel, and multiple tributaries 4 associated with respective video sources, indicated as a camera 10 and a videotape recorder 12. An additional tributary 14 is associated with the producer's control panel 16. The controller is able to transmit command messages in digital form to the tributaries over a bus 6 that is shown with solid lines, and the tributaries transmit response messages in digital form to the controller over a bus 8, shown with dashed lines.

A typical exchange of messages would begin with the control panel 16 issuing a command sequence to tributary 14. The controller 2 periodically executes a service poll over command bus 6, and tributary 14 responds to the service poll by forwarding the command sequence to the controller 2 over bus 8. If the command sequence is intended for camera 10, controller 2 forwards the command sequence to the tributary 4A, which forwards it to camera 10. Camera 10 executes the command and then formats a response sequence that is delivered to control panel 16 over the reverse route. For example, if the producer wishes the VTR to start playing and the camera to pan to a particular azimuth, he would operate the manual controls on the control panel 16 so that the control panel issues a PLAY command to be sent to VTR 12 followed by a PAN ($\phi$) command to be sent to camera 10. The PLAY command is forwarded by the control panel 16 to its tributary 14. Upon a service poll by the controller 2 over command bus 6, the PLAY command is tagged with the address of the VTR's tributary 4B and is forwarded to the controller 2 over the response bus 8. The controller then issues a BREAK command, which causes all tributaries to monitor the command bus 6, addresses tributary 4B, and forwards the PLAY command to tributary 4B over the command bus when tributary 4B indicates that it is able to receive a command. Each unaddressed tributary ignores further messages until a subsequent BREAK-address sequence is received addressed specifically for it. Tributary 4B then passes the PLAY command to VTR 12, which executes the PLAY command, formats a status reply message PLAYING, and forwards this message to its tributary 4B. As before, tributary 4B awaits a poll and then forwards the PLAYING response to controller 2 over response bus 8, controller 2 issues the BREAK command and forwards the PLAYING response to the control panel tributary 14 over command bus 6, and finally tributary 14 forwards the PLAYING response to control panel 16 which provides a visual indicator of the new PLAYING status. In similar manner, the command PAN ($\phi$) is sent from control panel 16 to tributary 14, over response bus 8 to controller 2, over command bus 6 to tributary 4A, and from tributary 4A to camera 10, and is executed. The reply message POSITION ($\phi$) is sent from camera 10 to tributary 4A, over bus 8 to controller 2, over bus 6 to tributary 14, and from tributary 14 to control panel 16, which provides a visual indicator of the camera's new azimuth position.

FIG. 2 illustrates in schematic form a data router 18 comprising four source lines $20_i$ (i=0–3) connected to respective sources $22_i$, four destination lines $24_j$ (j=0–3) connected to respective destinations $26_j$, and a rectangular matrix of crosspoints $28_{ij}$ that allow any source line to be connected to any destination line. As in the case of FIG. 2, i and j typically have equal ranges and the source $22_k$ and destination $26_k$ typically are the input and output sides of a communication port of the same device $30_k$. Thus, the router shown in FIG. 2 is able to support four devices 30. The router also comprises a controller 32 that is connected to each of the crosspoints for selectively controlling the states of the crosspoints.

In addition to the crosspoints and the controller shown in FIG. 2, the router includes input buffering to reduce input loading and provide a controlled termination for the incoming signal, and an output driver to clean up the signal and provide the energy that is necessary to transmit the signal over long interconnecting lines.

A router of the kind shown in FIG. 2 is able to provide either broadcast communication from, for example, source $22_0$ to any selected subset of destinations $26_1$–$26_3$, or full duplex communication between any two devices. In the broadcast mode, the controller 32 closes (renders conductive) a subset of the crosspoints in the horizontal row that is connected to the broadcasting source. In order to broadcast from source $22_0$ to destinations $26_2$ and $26_3$, the controller closes crosspoints $28_{02}$ and $28_{03}$. In order to provide full duplex communication between devices $30_1$ and $30_3$, the controller closes the crosspoints $28_{13}$ and $28_{31}$.

A large broadcast facility may have three or more studios and may also include edit bays. Although it would be possible for each studio and edit bay to be provided with a dedicated complement of all the machines it is expected to need, all connected to a network operating under the ESbus standard, it is not likely that each studio and each edit bay would be in use at the same time and that each would need all the machines that were available to it, and consequently there is a strong possibility that at any one time a significant number of machines would not be in use. It is therefore more economical to provide a central pool containing sufficient machines to meet the maximum expected requirements of the facility, and to reassign them among users (studios and edit bays) as needed. It would be convenient to be able to use a router to establish connection networks for the machines of a large broadcast facility, since by selecting the crosspoints that are closed, the network could be reconfigured to reassign machines as required. However, the ESbus standard requires that the controller be able to receive messages from any tributary, and this would require a router in which multiple crosspoints on a controller's destination line could be closed. Routers that are known to the applicants do not allow more than one crosspoint on any given destination line to be closed. Therefore, a given destination cannot receive messages from more than one source without reconfiguring the router.

SUMMARY OF THE INVENTION

In accordance with a first aspect of the invention there is provided a communication network for providing communication between multiple sources and multiple destinations. The communication network comprises source selector means having a plurality of input terminals connected to respective sources, at least one output terminal, and the means for connecting any selected set of the input terminals to the output terminal. The communication network further comprises destination selector means having at least one input terminal connected to the output terminal of the source selector means, a plurality of output terminals connected to respective destinations, and the means for connecting the input terminal of the destination selector means to any selected set of the output terminals of the destination selector means.

BRIEF DESCRIPTION OF THE DRAWINGS

For a better understanding of the invention, and to show how the same may be carried into effect, reference will now be made, by way of example, to the accompanying drawings in which.

DETAILED DESCRIPTION

Figure 1:
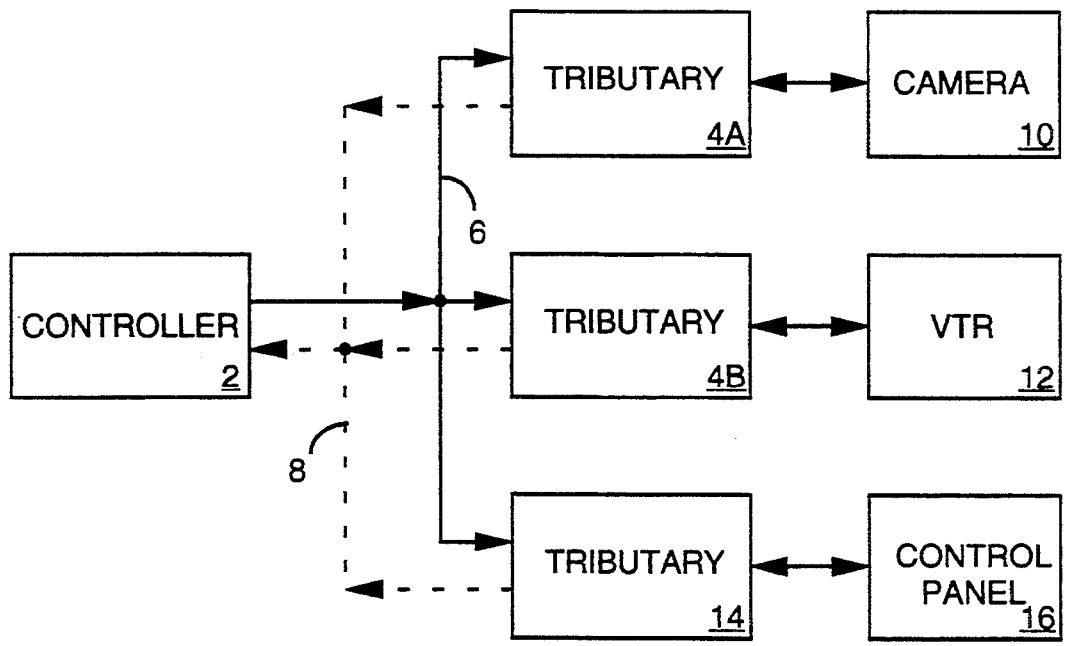
FIG. 1 is a simplified block diagram illustrating use of a network in accordance with the ESbus standard to connect a control panel to several machines in a video broadcast facility.
Figure 2:
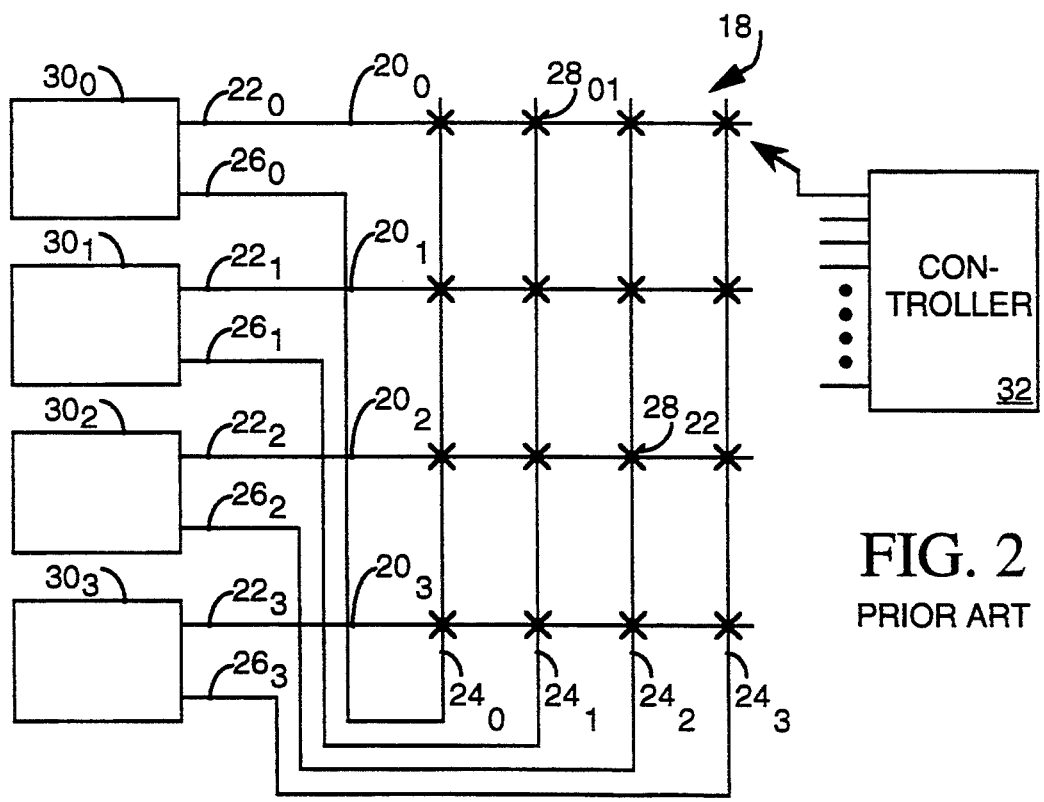
FIG. 2 is a simplified schematic representation of a data router.
Figure 3:
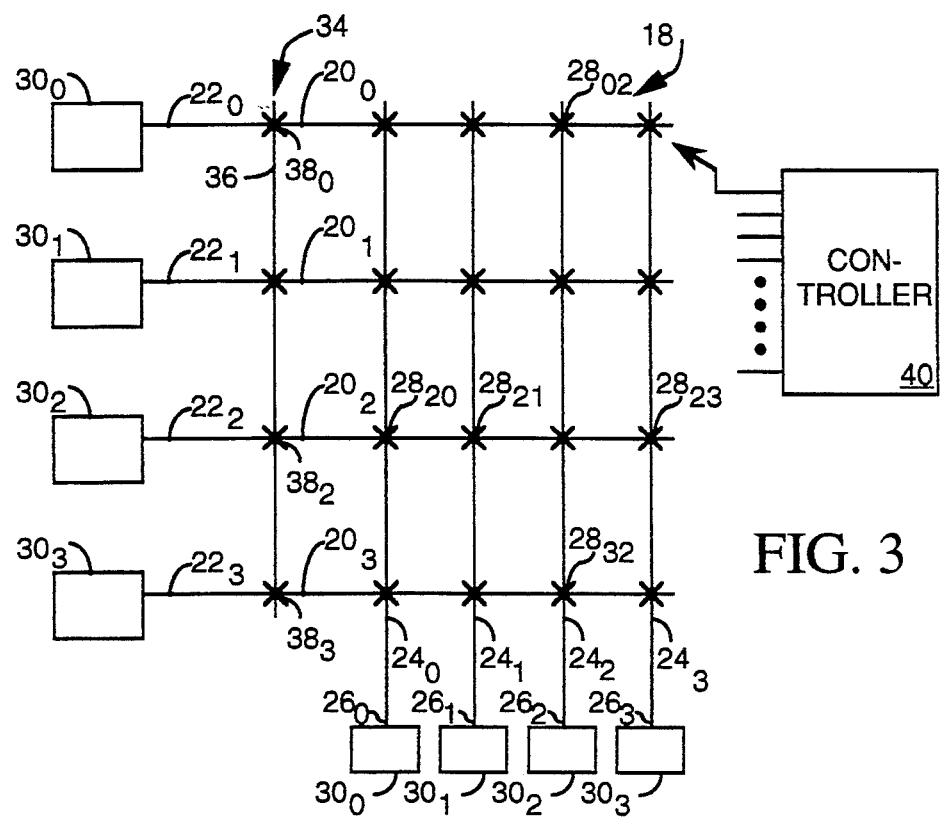
FIG. 3 is a simplified representation of a first communication network in accordance with the present invention.

The communication network shown in FIG. 3 includes a router 18 of the kind shown in FIG. 2 for interconnecting devices $30_i$ (i=1-4). In FIG. 3, the source and destination sides of the devices $30_i$ are shown separately, in order to avoid burdening the drawings with connection lines that are not necessary to an understanding of the invention. The network also includes a tie bus 34 that allows a subset of the source lines of the router to be connected together. The tie bus comprises a network connection line 36 that traverses the source lines $20_i$, and a linear array of crosspoints $38_i$ that allow the network connection line to be connected to any subset of source lines. A network controller 40 controls the crosspoints 28 and 38. When an ESbus network connection is desired, for example connecting device $30_2$ as controller to devices $30_0$ and $30_3$ as tributaries, the command bus is created by closing crosspoints $28_{20}$ and $28_{23}$ in the router. The response bus is created by closing crosspoints $38_0$ and $38_3$ of the tie bus, thereby interconnecting source $22_0$ and source $22_3$, and closing crosspoint $28_{02}$ or $28_{32}$ in the router. Command messages from the device $30_2$ are delivered to the devices $30_0$ and $30_3$ by way of the crosspoints $28_{20}$ and $28_{23}$. If, for example, crosspoint $28_{02}$ is closed, a response message from the device $30_0$, for example, is delivered to the router 18 on the source line $20_0$ and is connected directly to the destination line $24_2$ by the crosspoint $28_{02}$. A response message from the device $30_3$ is delivered to the destination line $24_2$ by way of the crosspoint $38_3$, the tie bus, the crosspoint $38_0$, the source line $20_0$ and the crosspoint $28_{02}$.

Figure 4:
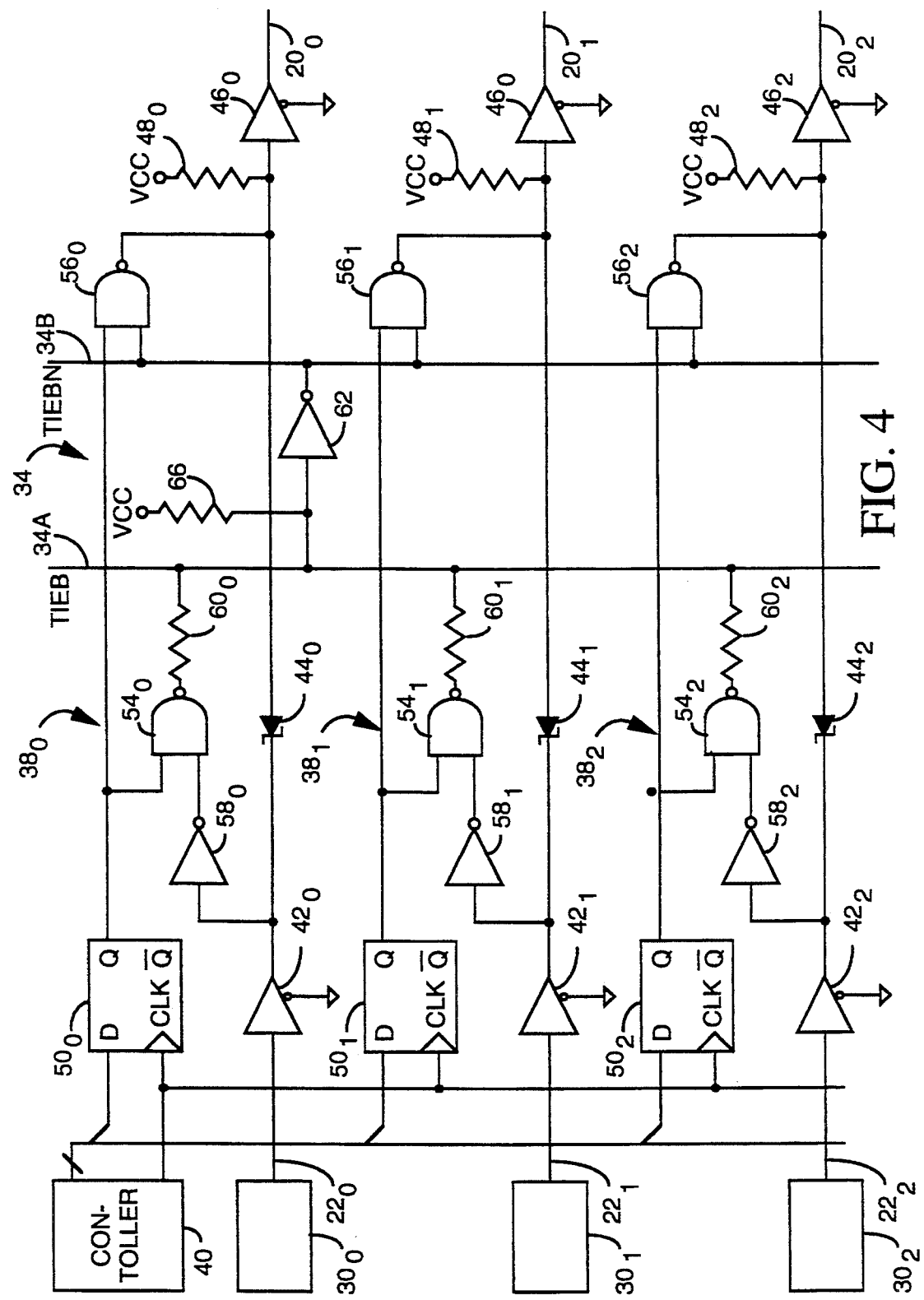
FIG. 4 is a block diagram of one component of the communication network shown in FIG. 3.

FIG. 4 shows the logic components of a segment of the tie bus. FIG. 4 illustrates three sources $22_0$, $22_1$ and $22_2$. When a given source is not providing a command or response message, its output terminal is in a 1 or marking state. When an asynchronous word is to be transmitted, it begins with a 0 or spacing level, followed by five to eight cells of individual data bits, and is then completed with a stop bit or 1 and returns to the marking state.

The tie bus 34 comprises two tie bus conductors 34A and 34B. The tie bus crosspoints 38 are implemented using high-speed CMOS (HC) logic devices, which provide voltage swings over substantially the entire range between ground and Vcc (+5 volts).

Each source 22 is connected to an amplifier 42 for buffering the tie bus and providing the necessary voltage swings to drive the tie bus crosspoints. Of course, if the sources provide signals at HC levels, the buffer amplifiers 42 are not required. The output of each amplifier 42 is connected through a Schottky diode 44 and an amplifier 46 to a source line 20 of the main router. The amplifier 46 buffers the tie bus voltage levels from the main router. The input of the buffer amplifier 46 is connected to Vcc through a resistor 48.

A tie bus control path is associated with each of the sources 22. Each tie bus control path comprises a latch 50 that holds the state of the tie bus crosspoint. The latch 50 has a state input connected to an output of the controller 40 and has its Q output connected both to one input of a NAND gate 54 and to one input of a NAND gate 56. The output of the buffer amplifier 42 is connected through an inverter 58 to the second input of the NAND gate 54 and the output of the NAND gate 54 is connected through a resistor 60 to the tie bus conductor 34A. The tie bus conductor 34A is connected to the tie bus conductor 34B through an inverter 62, whose input is connected to Vcc through a resistor 66. The resistor 66 and the tie bus conductor 34A function as a wired OR, i.e. a circuit arrangement having a single pull-up fed by multiple pull-downs. The tie bus conductor 34B is connected to the second input of the NAND gate 56, whose output is connected to the input of the buffer amplifier 46.

If the connection pattern requires that the crosspoint $38_0$ of the tie bus be open and that the crosspoints $38_1$ and $38_2$ be closed, the controller 40 applies a logical 0 to the state input of the latch $50_0$ and a logical 1 to the state inputs of the latches $50_1$ and $50_2$. These states are loaded into the latches on the next clock cycle. The Q output of the latch $50_0$ is then logical 0, and the Q outputs of the latches $50_1$ and $50_2$ are logical 1. The logical 0 at the Q output of the latch $50_0$ is applied to one input of each of the NAND gates $54_0$ and $56_0$. Thus, the output of the NAND gate $54_0$ is logical 1 regardless of the output of the buffer amplifier $42_0$ and the output of the NAND gate $56_0$ is logical 1 regardless of the state of the tie bus conductor 34B. The diode $44_0$ and resistor $48_0$ serve as a wired OR, so that the state of the output of the buffer amplifier $46_0$ corresponds to the state of the input of the amplifier $42_0$.

With the same connection pattern, the latches $50_1$ and $50_2$ are set and logical 1 is applied to one input of each of the NAND gates $54_1$, $54_2$, $56_1$, and $56_2$. If the source $22_1$ is at logical 0, the output of inverter $58_1$ is at logical 1 and the output of the NAND gate $54_1$ is at logical 0. The input of the inverter 62 is at logical 0, and so the tie bus conductor 34B is at logical 1. Since the resistor 66 serves as a wired OR relative to the outputs of the NAND gates 54, the input of the inverter 62 is at logical 0 and the tie bus conductor 34B is at logical 1. The output of each of the NAND gates $56_1$ and $56_2$ is logical 0. Thus, the logical 0 present at the input of the buffer amplifier $42_1$ is propagated to the outputs of the buffer amplifiers $46_1$ and $46_2$, regardless of the state of the source $22_2$.

It will be appreciated that there will be some stretching of the signal at the input of the buffer amplifier $46_1$ due to the two paths through which the logical 0 from the source $22_1$ reaches that point. However, this stretching is not objectionable at data rates below about 700 kbaud, and the data rate in the illustrated network is 128 kbaud. If in another application the pulse stretching should be objectionable, the direct paths could be disabled using additional logic controlled by the output of the latch 50.

If both sources $22_1$ and $22_2$ are at logical 1, the conductor 34A is at logical 1, the conductor 34B is at logical 0 and the output of each buffer amplifier $46_1$ and $46_2$ is logical 1.

It will be appreciated that if two sources connected to the tie bus have data at the same time, a collision will occur and the output will not accurately represent the signal provided by either source. This danger exists with current networks, and is obviated because most protocols allow for an orderly means of addressing each of several sources that require access to a bus, so that only one source is allowed to transmit at a time.

The resistor 60 connected between the NAND gate 54 and the tie bus conductor 34A provides a small series capacitance to decouple the NAND gate 54 from the conductor 34A, and also provides correction for the asymmetry of a wired OR falling edge.

Figure 5:
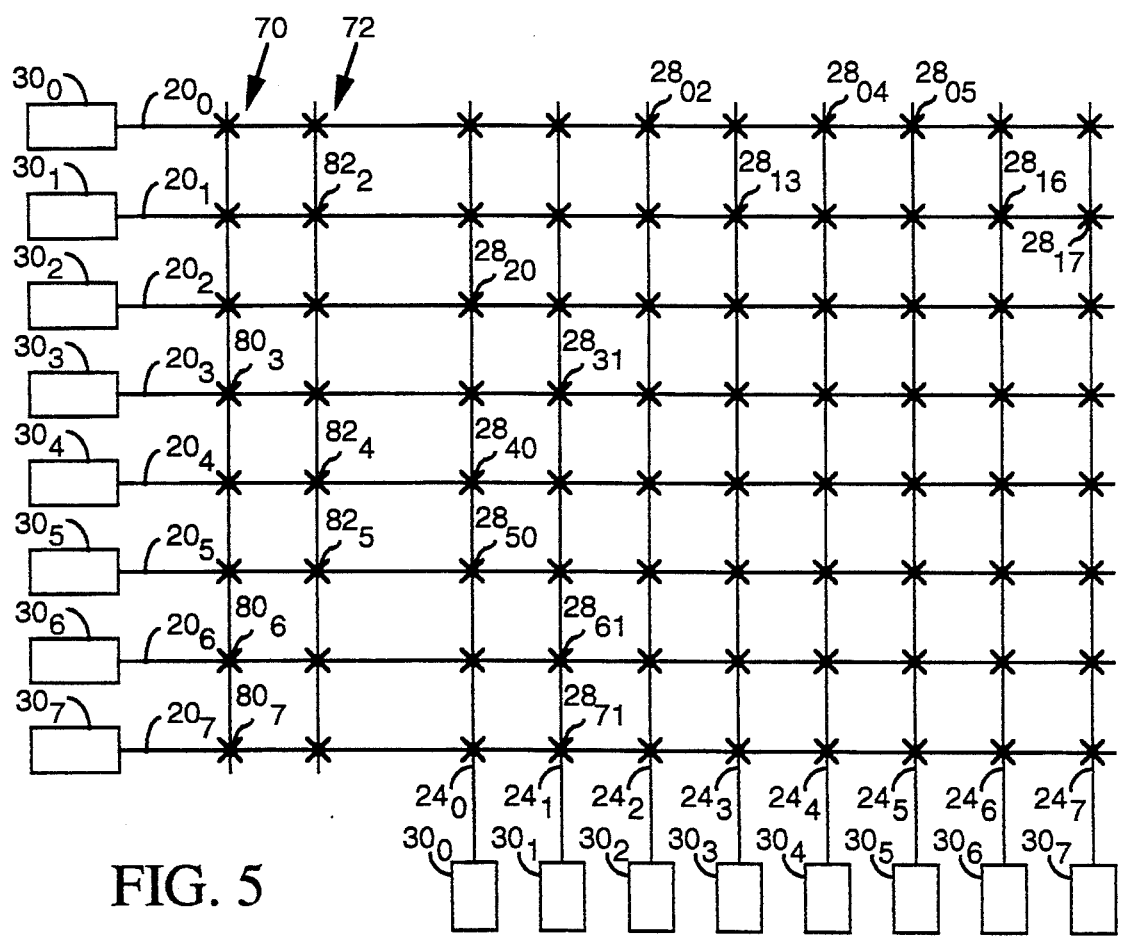
FIG. 5 is a simplified schematic of a second communication network in accordance with the invention.

A communication network supporting more devices might be provided with additional tie buses, allowing the establishment of additional networks. Thus, as shown in FIG. 5, two tie buses 70, 72 each traverse eight source lines $20_0$–$20_7$, and each tie bus includes a linear array of crosspoints that allow the network connection line to be connected to any subset of source lines. The network controller (not shown in FIG. 5) controls the states of the tie bus crosspoints to allow the source lines of the router to be connected in two mutually exclusive subsets. For example, if a first network is required to connect device $30_1$ as controller and devices $30_3$, $30_6$ and $30_7$ as tributaries and a second network to connect device $30_0$ as controller and devices $30_2$, $30_4$ and $30_5$ as tributaries, the network controller implements the command bus for the first network by closing crosspoints $28_{13}$, $28_{16}$ and $28_{17}$ of the main router and implements the response bus for the first network by closing crosspoints $80_3$, $80_6$ and $80_7$ of the first tie bus and any one of crosspoints $28_{31}$, $28_{61}$ and $28_{71}$ of the main router. In similar fashion, the second network is implemented by closing crosspoints $28_{02}$, $28_{04}$ and $28_{05}$ in the main router, crosspoints $82_2$ $82_4$, and $82_5$ of the second tie bus, and any one of crosspoints $28_{20}$, $28_{40}$ and $28_{50}$ in the main router.

Figure 6:
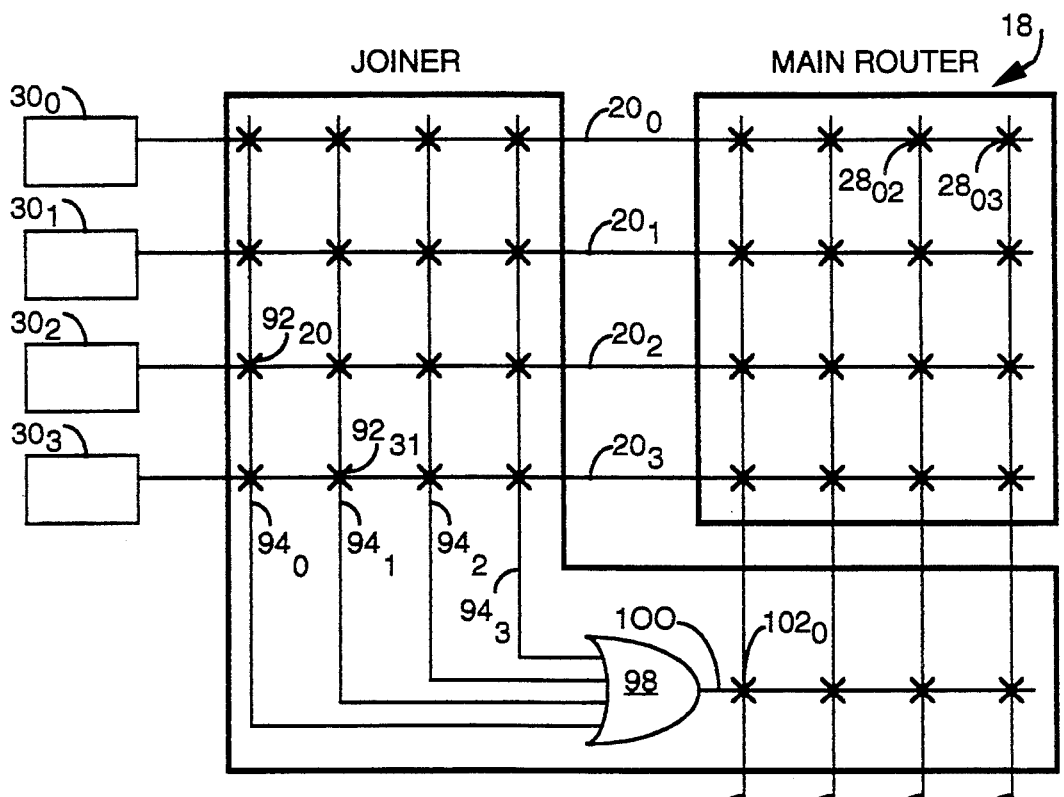
FIG. 6 is a simplified representation of a third communication network in accordance with the invention.

The communication network shown in FIG. 6 comprises a main router 18 and an auxiliary matrix 90 having output lines $94_m$ (m=0–3) and crosspoints $92_{im}$ for connecting any one of the source lines 20 to any one of the auxiliary matrix output lines 94. The auxiliary matrix output lines 94 are connected to respective inputs of an OR gate 98, whose output is connected to an output bus 100 provided with multiple crosspoints $102_j$, connectable to the destination lines $24_j$ respectively. If, for example, a network is to be formed connecting device $30_0$ as controller and devices $30_2$ and $30_3$ as tributaries, the network controller creates the command bus by closing crosspoints $28_{02}$ and $28_{03}$ of the main router and creates the response bus by closing crosspoints $92_{20}$ and $92_{31}$, for example, of the auxiliary matrix and crosspoint $102_0$ of the output bus the inverters 46 would be omitted.

Figure 7:
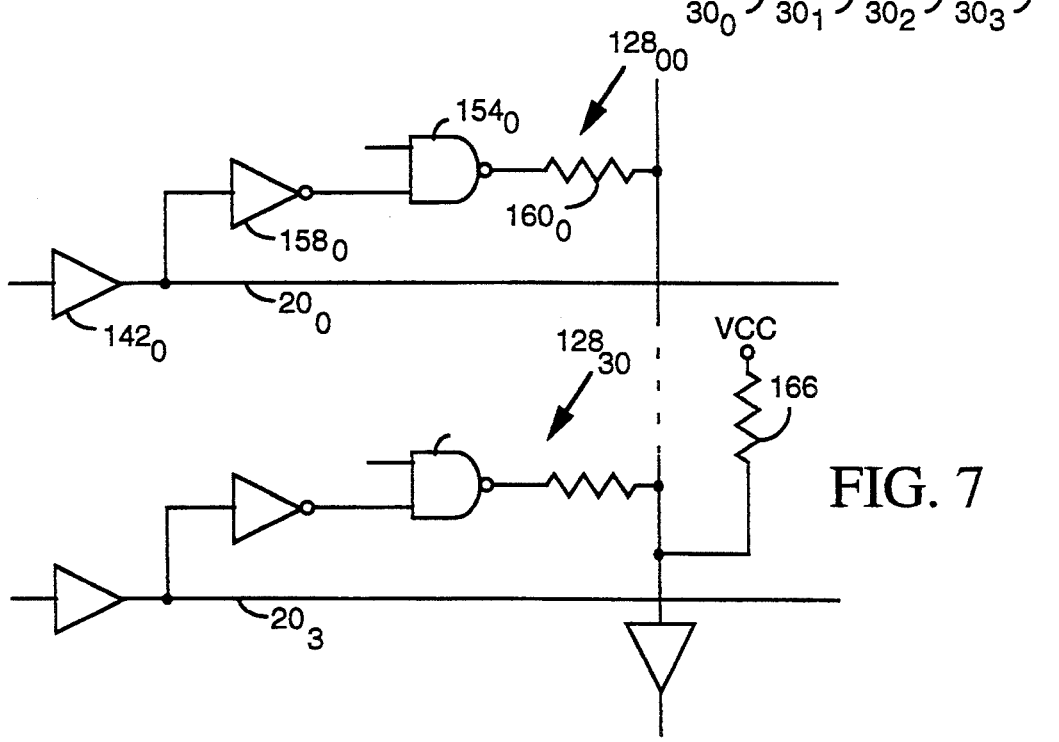
FIG. 7 is a simplified representation of a fourth communication network in accordance with the invention.

FIG. 7 illustrates crosspoints 128 that could be employed in a router having the topology shown in FIG. 2 to allow the router to create both a command bus and a response bus without need for a tie bus as shown in FIGS. 3, 4 and 5 or a combiner as described with reference to FIG. 6. The crosspoint 128, which is effective between a source line 20 and a destination line 24, is similar to the crosspoint 38 that is effective between the source line 20 and the tie bus 34 shown in FIG. 4, except that the components associated with the conductor 34B are omitted. Thus, the output of each NAND gate 154 is connected through a resistor 160 to the destination line 24, and a resistor 166 connected to the destination line 24 serves as a wired OR. This type of crosspoint allows multiple crosspoints on a single destination line to be closed. For example, in order to form a network that connects device $30_0$ as controller and devices $30_2$ and $30_3$ as tributaries, the network controller creates the command bus by closing crosspoints $128_{02}$ and $128_{03}$ and creates the response bus by closing crosspoints $128_{20}$ and $128_{30}$.

It will be appreciated that the invention is not restricted to the particular embodiments that have been described, and that variations may be made therein without departing from the scope of the invention as defined in the appended claims and equivalents thereof. For example, although the invention has been illustrated by reference to four devices and by reference to eight devices, the invention is applicable to creation of networks for interconnecting many more devices than eight.

We claim:

1. A communication network for providing communication between n sources and m destinations, where m and n are positive integers greater than one, comprising:

source selector means comprising n source lines for connection to the n sources respectively, a tie bus, and n crosspoint elements operable selectively for connecting any selected set of source lines to the tie bus, whereby the selected set of source lines are interconnected by the tie bus and one of said selected set of source lines constitutes an output terminal of the source selector means, and destination selector means comprising n router buses connected to the n source lines respectively, m destination lines for connection to the m destinations respectively, and crosspoint means for connecting the router bus that is connected to said one of said selected set of source lines to any selected set of the m destination lines.

2. A communication network according to claim 1, comprising a tie bus controller, and wherein the tie bus comprises at least one tie bus conductor and each crosspoint element comprises logic means responsive to the tie bus controller for connecting each source line of said selected set to the tie bus conductor.

3. A communication network according to claim 1, comprising a tie bus controller, and wherein the tie bus comprises first and second tie bus conductors and an inherent OR device having an input side connected to the first tie bus conductor and an output side connected to the second tie bus conductor, and each crosspoint element comprises a first logic circuit responsive to the tie bus controller for connecting each source line of said selected set to the first tie bus conductor, and a second logic circuit responsive to the tie bus controller for connecting the second tie bus conductor to said one of said selected set of source lines.

4. A communication network according to claim 3, wherein the second logic circuit is a combinational logic circuit that is responsive to both the tie bus controller and the second tie bus conductor for selectively connecting the second tie bus conductor to said one of said selected set of source lines.

5. A communication network according to claim 1, comprising a tie bus controller, and wherein the tie bus comprises first and second tie bus conductors and an inherent OR device having an input side connected to the first tie bus conductor and an output side connected to the second tie bus conductor, and the ith, i=1 . . . n, crosspoint element comprises a first combinational logic circuit responsive to the tie bus controller and the ith source line for connecting the ith source line to the first tie bus conductor when the ith source line is at a predetermined logic level, and a second combinational logic circuit responsive to the tie bus controller and the second tie bus conductor for connecting the second tie bus conductor to the ith source line.

6. A communication network for providing communication between multiple sources and multiple destinations, comprising:

source selector means comprising a plurality of source lines for connection to the sources respectively, a first tie bus conductor, a plurality of crosspoint elements operable selectively for connecting any selected set of source lines to the first tie bus conductor, whereby the selected set of source lines are interconnected and one of the selected set of source lines constitutes an output terminal of the source selector means and each of the other source lines of the selected set of source lines is connected to the output terminal of the source selector means through the tie bus, a second tie bus conductor, means for connecting the second tie bus conductor to said selected set of source lines, and an inherent OR device having an input side connected to the first tie bus conductor and an output side connected to the second tie bus conductor, and destination selector means having at least one input terminal connected to the output terminal of the source selector means, a plurality of output terminals for connection to respective destinations, and means for connecting the input terminal of the destination selector means to any selected set of the output terminals of the destination selector means.

7. A communication network according to claim 6, wherein the destination selector means comprise a plurality of destination lines connected to respective output terminals of the destination selector means, a plurality of router buses connected to the source lines respectively, and crosspoint means for connecting the router bus that is connected to the source line that constitutes the output terminal of the source selector means to any selected set of destination lines.

8. A communication network according to claim 6, comprising a tie bus controller, and wherein each crosspoint element comprises a first combinational logic circuit responsive to the tie bus controller and a given source line for connecting the given source line to the first tie bus conductor when the given source line is at a predetermined logic level, and the means for connecting the second tie bus conductor to said selected set of source lines comprise a second combinational logic circuit responsive to the tie bus controller and the second tie bus conductor for connecting the second tie bus conductor to said selected set of source lines.

9. A communication network for providing communication between multiple sources and multiple destinations, comprising:

source selector means comprising n source lines for connection to the sources respectively, a first tie bus conductor, n crosspoint elements operable selectively for connecting any selected set of source lines to the first tie bus conductor, whereby the selected set of source lines are interconnected, a second tie bus conductor, means for connecting the second tie bus conductor to said selected set of source lines, and an inherent OR device having an input side connected to the first tie bus conductor and an output side connected to the second tie bus conductor, and destination selector means having n input terminals connected to the source lines respectively, m output terminals for connection to respective destinations, and means for connecting any selected one the n input terminals of the destination selector means to any selected set of the m output terminals of the destination selector means.

10. A communication network according to claim 9, wherein the destination selector means comprise m destination lines connected to respective output terminals of the destination selector means, n router buses connected to the n input terminals respectively of the destination selector means, and crosspoint means for connecting the router bus that is connected to the selected one of the n input terminals of the destination selector means to any selected set of destination lines.

11. A communication network according to claim 9, comprising a tie bus controller, and wherein the ith crosspoint element, i=1 . . . n, comprises a first combinational logic circuit responsive to the tie bus controller and the ith source line for connecting the ith source line to the first tie bus conductor when the ith source line is at a predetermined logic level, and the means for connecting the second tie bus conductor to said selected set of source lines comprise a second combinational logic circuit responsive to the tie bus controller and the second tie bus conductor for connecting the second tie bus conductor to said selected set of source lines.

* * * * *